(12) United States Patent
Paranchych et al.

(10) Patent No.: US 6,754,191 B1
(45) Date of Patent: Jun. 22, 2004

(54) METHOD AND APPARATUS FOR SUPPLEMENTAL CHANNEL SOFT HAND OFF IN CDMA SYSTEMS

(75) Inventors: David Paranchych, Richardson, TX (US); Geng Wu, Plano, TX (US); Ashvin Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 713 days.

(21) Appl. No.: 09/599,716

(22) Filed: Jun. 22, 2000

(51) Int. Cl.[7] .................. H04Q 7/00; H04B 7/216
(52) U.S. Cl. ................. 370/331; 370/332; 370/335
(58) Field of Search .................... 370/331, 335, 370/342, 431, 332; 375/130; 455/436, 439, 442

(56) References Cited

U.S. PATENT DOCUMENTS

| | | | |
|---|---|---|---|
| 6,167,270 A | * 12/2000 | Rezaiifar et al. | 455/442 |
| 6,195,552 B1 | * 2/2001 | Jeong et al. | 455/436 |
| 6,418,148 B1 | * 7/2002 | Kumar et al. | 370/468 |
| 6,449,481 B1 | * 9/2002 | Kwon et al. | 455/437 |
| 6,516,196 B1 | * 2/2003 | Chen et al. | 455/450 |

* cited by examiner

Primary Examiner—Duc Ho
(74) Attorney, Agent, or Firm—James A. Harrison; Bruce E. Garlick (57) ABSTRACT

A system determines an optimal set of base transceiver sets that are to transmit data over supplemental channels to a mobile station. A mobile station transmits periodic signal strength measurement message to rank the pilot signal strengths being received from the plurality of base station transceiver systems. Whenever the number of fundamental channel sectors that are active exceeds the maximum number of active supplemental channel sectors, periodic pilot strength measurement messages are transmitted by the mobile station. To improve resource usage, periodic pilot strength measurement messages are not transmitted as often as required to insure that the active supplemental channel sectors are the ones from which the strongest signals are received by the mobile station. Rather, a combination of periodic pilot strength measurement messages and calculated reverse link signal strength over spectral noise density values are used.

13 Claims, 9 Drawing Sheets

METHOD AND APPARATUS FOR SUPPLEMENTAL CHANNEL SOFT HAND OFF IN CDMA SYSTEMS

BACKGROUND

1. Field of the Invention

The present invention relates generally to communications systems and particularly to channel selection in a code division multiple access communication system.

2. Description of Related Art

Because the radio frequency (RF) spectrum is limited, the government, more particularly, the Federal Communications Commission (FCC), governs the use of the radio frequency spectrum. This regulation includes deciding frequency band allocation among the various industries. Since the RF spectrum is limited, only a small portion of the spectrum can be assigned to each industry. Accordingly, the assigned spectrums must be used efficiently in order to allow as many frequency users as possible to have access to the spectrum.

Because the number and size of frequency bands are limited, multiple access modulation techniques are continuously being developed and improved to improve efficiency and capacity and to maximize use of the allocated RF spectrum. Examples of such modulation techniques include time division multiple access (TDMA), frequency division multiple access (FDMA), and code division multiple access (CDMA).

CDMA modulation employs a spread spectrum technique for the transmission of information. CDMA modulation techniques are becoming popular because they enable more users to communicate at a given time. A spread spectrum system uses a modulation technique that distributes the transmitted signal over a wide frequency band. This frequency band is typically substantially wider than the minimum bandwidth required to transmit the signal. The spread spectrum technique is accomplished by modulating each baseband data signal to be transmitted with a unique wideband spreading code. Using this technique a signal having a bandwidth of only a few kilohertz can be spread over a bandwidth of more than a megahertz. A form of frequency diversity is obtained by spreading the transmitted signal over a wide frequency range. Since only 200–300 kHz of a signal is typically affected by a frequency selective fade (interference), the remaining spectrum of the transmitted signal is unaffected. A receiver that receives the spread spectrum signal, therefore, will be affected less by the fade condition.

In a CDMA telephone system, multiple signals are transmitted at the same frequency. A particular receiver then determines which signal is intended for that receiver by the unique spreading code in the signal. The signals at that frequency without the particular spreading code intended for that particular receiver appear as noise to the receiver and are ignored.

New generation CDMA communication networks are being formed to facilitate the transmission of large amounts of data on an as needed basis. Accordingly, a fundamental channel set is defined for transmitting on going communications between the base station transceiver systems and the mobile stations. Additionally, supplemental channels are being defined to transmit large amounts of data to a mobile station for use as needed. Because CDMA systems typically include the transmission of the communications signals from a plurality of base station transceiver systems to a given mobile station, significant amounts of resources are consumed especially when a plurality of supplemental channels are being used by a plurality of base station transceiver systems to deliver large volumes of data to the mobile station. In particular, because the supplemental channels are formed to be able to carry large amounts of data, there is a need for efficiently reserving capacity for supplemental channel data transmission only from the base station transceiver systems that are transmitting the signals to the mobile station the most clearly. By reducing the number of base station transceiver systems that transmit data over a supplemental channel to a mobile station, resources in other base station transceiver systems are not wasted and may be used for other purposes. Accordingly, there is a need for efficiently and effectively selecting the base station transceiver systems that best transmit data over the supplemental channels.

SUMMARY OF THE INVENTION

The present system and method of use comprises a system that solves the aforementioned problems by efficiently determining the optimal set of base station transceiver systems (BTSs) that are to transmit data over supplemental channels to a mobile station. More specifically, the invention includes having the mobile station transmit periodic signal strength measurement message to the BTSs to rank the pilot signal strengths being received from the plurality of base station transceiver systems. Whenever the number of fundamental channels that are active exceeds the maximum allowable number of active supplemental channels, the periodic pilot strength measurement message are transmitted by the mobile station. However, to improve resource usage, the periodic pilot strength measurement messages are not transmitted as often as required to insure that the active set of supplemental channels are the ones receiving the strongest signals. Rather, a combination of periodic pilot strength measurement messages and calculated reverse link signal strength over spectral noise density values are used to determine which BTSs should be used for the active set of supplemental channels.

More specifically, if less than a specified amount of time has elapsed since the last pilot strength measurement message was received by a BTS from a mobile station, then the pilot strength measurement message is used to rank the supplemental channels and corresponding BTSs. If, however, more than a specified amount of time has elapsed, then a calculated reverse link signal to noise ratio (Eb/No) is used to rank the BTSs and corresponding and supplemental channels. Eb/No is the total measured Eb/No across all multipath and all receive antennas per sector. In one embodiment of the invention, the list of active supplemental channels is determined at the time in which a supplemental channel is first required. Accordingly, system resources are optimized in a manner that effectively defines the supplemental channels whose signals are most likely to be received clearly by the mobile station.

DETAILED DESCRIPTION OF THE DRAWINGS

Figure 1:
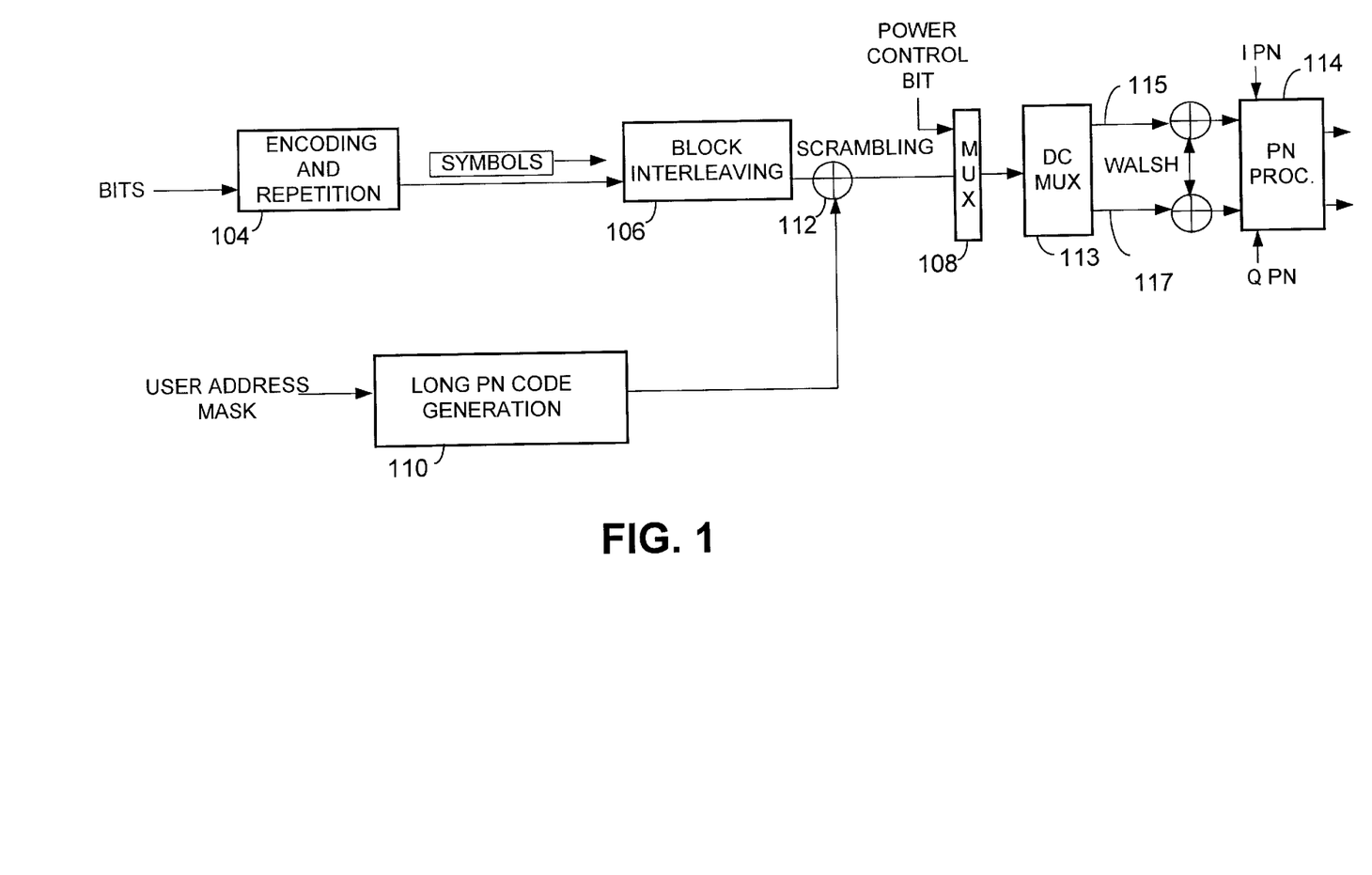
FIG. 1 illustrates a typical CDMA transmitter system for use on the forward channel from a base station transceiver system (BTS) to a CDMA mobile station.

FIG. 1 illustrates a typical CDMA transmitter system for use on the forward channel from a base station transceiver system (BTS) to a CDMA mobile station. An encoder 104 creates a digital baseband signal by encoding a digitized signal representing an analog voice or digital data service. An encoder 104, accepts data bits in and produces code symbols on an output. For each clock cycle, a new data bit is shifted into a register of the encoder 104 and the data bit previously received is output. The various inputs of an encoder are added (modulo 2) to produce two or more symbols out for each clock cycle. Since the new symbols generated for each clock cycle are derived from the values of the new bit being input in all current data bits occupying the shift register during a given interval, a certain level of predictability can be realized. The output symbols of the encoder 104, are then produced to a block interlever 106. The block interlever 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to decorrelate the data and to separate adjacent symbols in time.

One advantage of this process is that the effects of bursty errors may be diminished and information eliminated by the bursty error may potentially be recovered. Moreover, in some embodiments, lower transmission rate data is repeated. Here, the lower rate repeated symbols are also separated therefore increasing the survivability of symbols to signal bit errors. In addition, for reasons beyond this application, the data array that is output by the block interleaver 106 is slightly modified in that defined power control bits are inserted in place of various data symbols.

The power control bits are used for power control purposes to optimize network effectiveness. Each symbol that is output from the multiplexer 108 is produced to a de-multiplexer 113, which passes the input bits alternately to an in-phase branch 115 and a quadrature branch 117. Each symbol that is output from the de-multiplexer 113 is exclusively ORed with an assigned Walsh function. The Walsh function is what, in a CDMA context, creates the channels of communication. Stated simply, each symbol is added across a defined bit sequence Continuing to refer to FIG. 1, a long PN code generator 110 generates long pseudo random number (PN) sequences to generate user-specific sequences of symbols. The Walsh code spread symbols from the combiner 112 are then spread in quadrature. The symbols are input to two exclusive OR combiners to generate a pair of short PN sequences. The first combiner exclusively ORs the Walsh code spread symbols on the in-phase branch 115 with the end phase sequence while the second combiner exclusively ORs the Walsh code spread symbols on the branch 117 with the quadrature phase (I) and (Q) sequences. The I and Q sequences are then produced to a PN processor 114 that, in turn, produces the final In Phase and Quadrature chip sequences for transmission.

The resulting I and Q channel code spread sequences are used to bi-phase modulate a quadrature pair of sinusoids by driving the power level of the pair of sinusoids. The sinusoidal output signals are then processed for transmission by an antenna.

Figure 2:
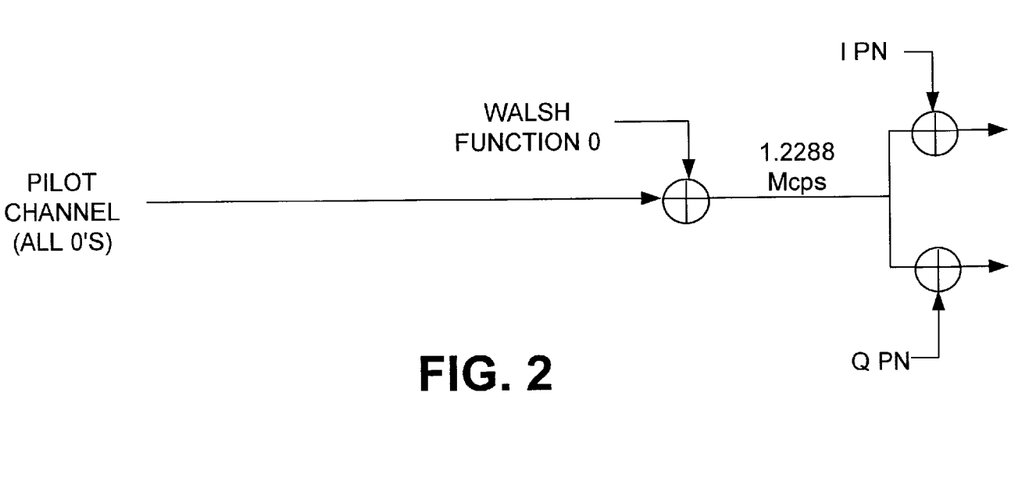
FIG. 2 is a function block diagram illustrating the operation of a pilot channel.

FIG. 2 is a functional block diagram illustrating the operation of a pilot channel. The pilot channel is a reference channel that mobile stations use for acquisition, timing, and as a phase reference for coherent demodulation. The pilot channel signal is transmitted at all times by each base station on each active CDMA frequency. Each mobile station continuously tracks the pilot signal. Unlike long code sequences, pilot channel sequences are repeated many times every few seconds. For example, in one known system, the pilot sequence is repeated 75 times every two seconds. Not only does this aid a mobile station in its initial acquisition when it powers up, but also ensures rapid detection of cells or base station transceiver systems that form good handoff candidates.

The same PN sequence for the pilot channel is shared by all base stations. However, each base station transmits the pilot channel at a unique phase offset value. Thus, the timing of the pilot channel provides tracking of a timing reference for a given base station and phase reference. The phase separation provides for extremely high reuse within one CDMA channel frequency. The uncoded nature of the pilot signal facilitates acquisition by the mobile stations in addition to the short duration of the pilot PN sequence.

In one described embodiment, the pilot channel is sent unmodulated, and is orthogonally spread with a Walsh function zero to ensure that it is easily recognized. Quadrature spreading and channel filtering occur exactly as discussed for all forward channel traffic.

Figure 3:
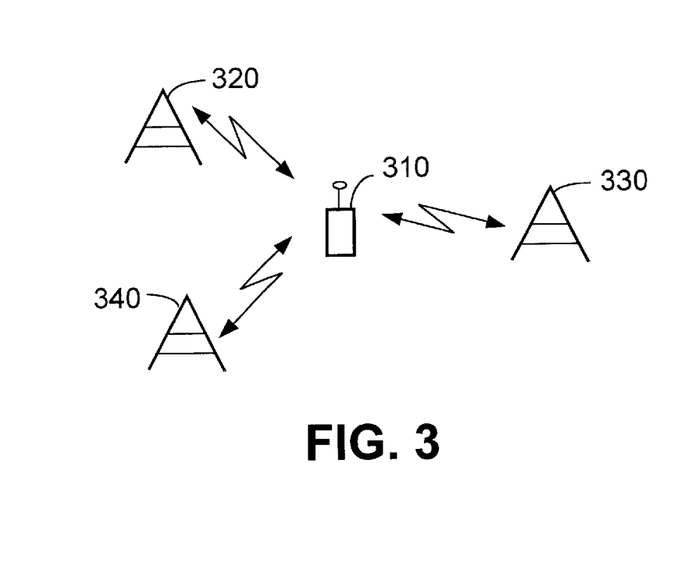
FIG. 3 is a functional block diagram illustrating a mobile station in communication with a plurality of base stations.

FIG. 3 is a functional block diagram illustrating a mobile station in communication with a plurality of base stations. More specifically, FIG. 3 illustrates a mobile station 310 in communication with, or at least receiving the pilot signals from various base station transceiver systems coupled to towers 320, 330, and 340. As mentioned above with respect to FIG. 2, each base station transmits a pilot channel at a unique phase offset value. Accordingly, as the mobile station receives the three different pilot channel signals, it may identify the base station by the relative phase offsets.

In operation, mobile station 310 continuously evaluates the signal strength of the pilot channel signals that are continuously transmitted by each of the three BTS towers 320, 330, and 340 to determine which BTS should be used for carrying the forward channel communications signals (from the BTS to the mobile station). Additionally, the mobile station 310 evaluates the signal strength trends of the pilot channels to continuously create a list of candidate base stations in the event that a hand off is necessary from one base station to another.

Typically, a mobile station will request a handoff from one base station to another when it determines that the signal strength of the new base station is stronger or will soon be stronger than that of the current base station carrying the communication signals to the mobile station. Thus, in the example of FIG. 3, mobile station 310 communicates with one of the three BTSs while the other two are kept in its candidate list for handoff purposes.

Figure 4:
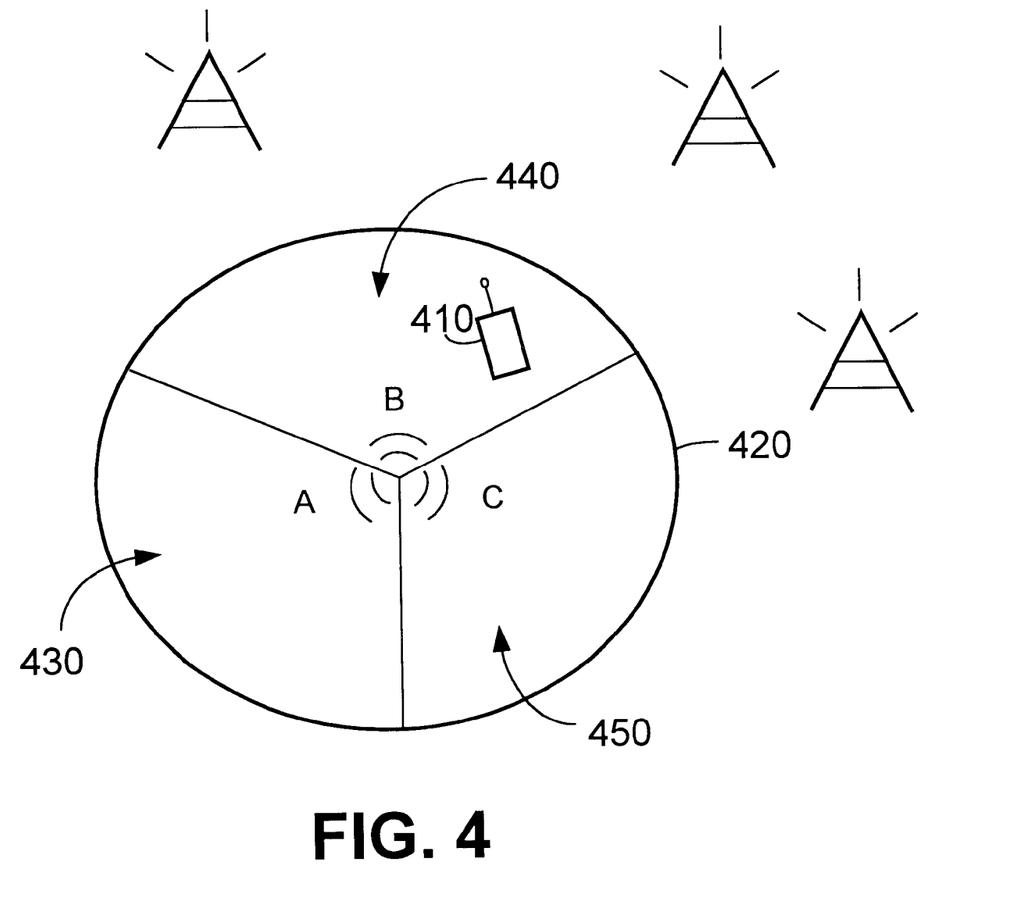
FIG. 4 is functional block diagram illustrating the operation of a mobile station with respect to a plurality of sectors defined by a given base station transceiver system.

FIG. 4 is functional block diagram illustrating the operation of a mobile station with respect to a plurality of sectors defined by a given base station transceiver system. As may be seen from examining FIG. 4, a mobile station 410 is in communication with a BTS characterized by a cell area 420. In other words, the mobile station 410 is transmitting its reverse link communication signals through the BTS that has created the cell 420. FIG. 4 further illustrates that a given BTS further defines a plurality of cell sectors 430, 440, and 450. As may be seen, mobile station 410 is within sector 440 of the cell 420. As is known by those skilled in the art, the plurality of cell sectors is often created by a plurality of corresponding directional antennas that transmit signals that propagate outwardly in a range of directions characterized by an angle. In the example of FIG. 4, three directional antennas each define a 120-degree range of direction (cell sectors).

Thus, similar to the concept of a plurality of cells, mobile station 410 communicates with the antennas that create cell sector 440. As a mobile station transitions from one cell to another, a handoff from BTS to BTS occurs that is known as a "soft handoff". The handoff is referred to as "soft" because there are no frequency changes that occur due to the nature of CDMA modulation techniques. Similarly, as the mobile station transitions into a different sector of the same cell, a "softer handoff" occurs as the communication signals are relayed by the antenna that defines the new sector into which the mobile station 410 is traveling. The "softer handoff" refers to a transition from one BTS sector to another sector served by the same BTS.

Figure 5A:
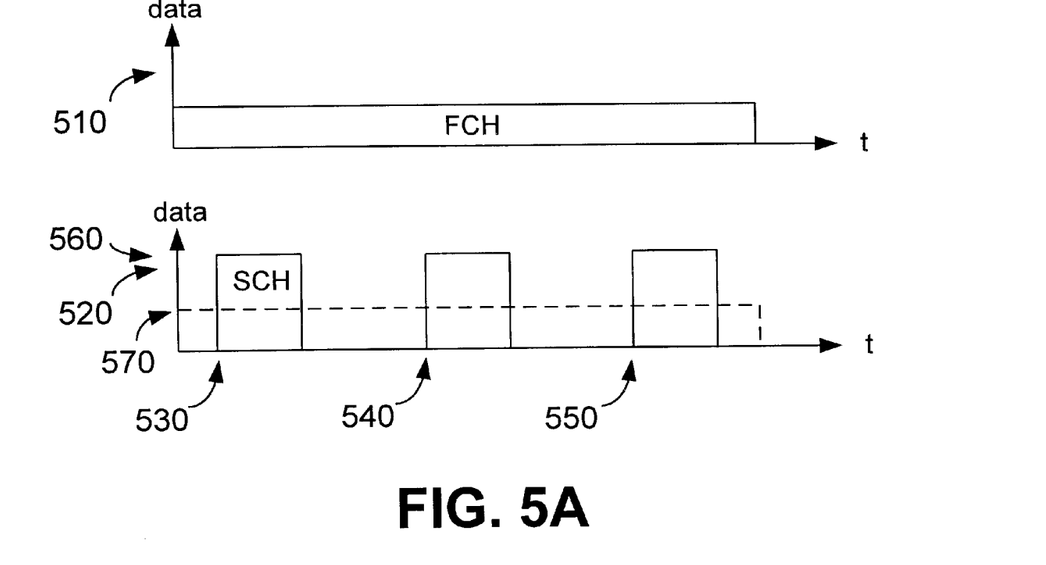
FIG. 5A is a timing diagram illustrating a difference in usage between a fundamental channel and a supplemental channel in modern CDMA networks.

FIG. 5A is a timing diagram illustrating a difference in usage between a fundamental channel and a supplemental channel in modern CDMA networks. A fundamental channel is a channel that is routinely used to transmit data from a base station to a mobile station. A supplemental channel, on the other hand, is one that is reserved for transmitting large amounts of data in a temporary data burst from the base station to the mobile station on the forward link. Thus, as is illustrated in FIG. 5A, the amount of data transmitted over the fundamental channel, as shown generally at 510, is constant over time. With respect to the supplemental channel, however, the data pattern may be described as bursty.

More specifically, and referring now to the portion of FIG. 5A shown generally at 520, the supplemental channel is characterized by periods of no data, and by periods characterized by the transmission of large amounts of data relative to the fundamental channel. As may be seen, in the chart portion shown generally at 520, three data bursts are shown beginning at time periods 530, 540, and 550. Also as may be seen, the amount of data for the supplemental channel, shown at 560 is notably greater than the amount of data transmitted by the fundamental channel shown generally at 570.

In current CDMA systems, the fundamental channels are limited to carry data at one of two data rates, namely, 9.6 or 14.4 kilobits per second. The supplemental channel, however, is variable in rate. In some CDMA networks, the supplemental channel may be used to carry data in rates of 9.6, 19.2, 38.4, 76.8, and 153.6 kilobits per second. As may be seen therefore, at a maximum rate, the supplemental channel can carry almost eleven times more data over a given period of time.

Figure 5B:
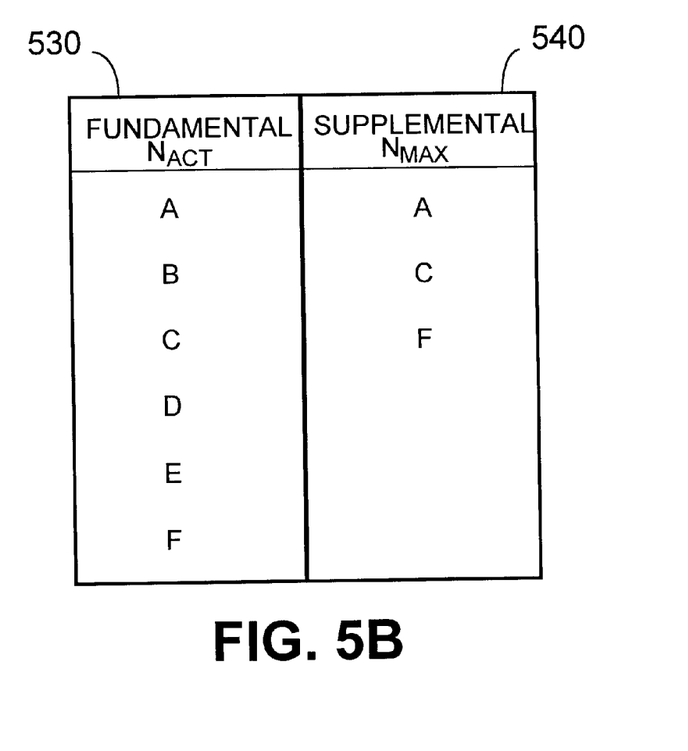
FIG. 5B is a table illustrating an example of channel allocations for a given mobile station in communication with a plurality of base stations.

FIG. 5B is a table illustrating an example of channel allocations for a given mobile station in communication with a plurality of base stations. As may be seen from referring to FIG. 5B, a given mobile station may have approximately up to six active channels being used as the fundamental channel for carrying ordinary data communications. As may be seen in the column shown generally at 530, the mobile station is receiving data over a fundamental channel from six different sectors, which may be from up to six different base stations. Each of the sectors is represented by a letter A–F. The same mobile station may utilize up to three sectors for receiving data during those periods in which transmission over a supplemental channel is necessary.

Typically, the maximum number of sectors that may be used for a supplemental channel is limited to approximately two or three sectors for carrying data because the supplemental channels can consume much greater amounts of channel resources compared to the fundamental channels. Thus, the maximum number of sectors for use by supplemental channels is often referred to as $N_{MAX}$. While not shown specifically in FIG. 5B, supplemental channels are only allocated to a mobile station when there is a need to use a supplemental channel to transmit data in one embodiment of the present invention. Accordingly, while a mobile station is receiving data over a supplemental channel, it will decode the data from one sector, while also receiving it from one or two other sectors in the event that a soft or softer handoff is necessary.

Referring again to FIG. 4, mobile station 410 is shown within sector 440 of the cell 420. However, as may be seen, plurality of other BTSs is shown in FIG. 4, each of which may be transmitting, to the mobile station 410 over a fundamental channel or a fundamental channel and a supplemental channel. Because supplemental channels consume large amounts of resource relative to a fundamental channel in each sector, there is a need to minimize the number of sectors that are used to transmit data to a mobile station, such as mobile station 410 of FIG. 4. Therefore, in the described embodiment, the active set of supplemental channels are limited to a number $N_{MAX}$, which may be significantly lower than the number of fundamental channels, it is very important to develop a system that selects the best (typically two or three) supplemental channels which truly are being received the most clearly by the mobile set. Accordingly, there is a need for selecting the active supplemental channel set in a reliable way.

The active sets are defined as the pilot signals associated with the forward traffic channels that are assigned to the mobile station. The candidate sets are the pilots not currently in the active set but being received by the mobile station with sufficient strength to indicate that the corresponding traffic channels can be successfully demodulated. The neighbor sets are those pilots that are not currently in the active or candidate sets but are likely handoff candidates.

The pilot strength measurement message is used by the mobile station to direct the base station in the handoff process. Within this message, the mobile station reports the strength of the pilots associated with the forward traffic channels currently being demodulated (whether it would be likely to receive traffic from them), as well as the pilots from the neighbor and remaining lists that are being received with sufficient strength so that traffic could be demodulated from them successfully if necessary. Ordinarily, a pilot strength measurement message is sent under specified conditions.

For example, one condition is that a mobile station finds a sufficiently strong pilot in the neighbor or remaining sets that is not associated with any of the Active Set and Candidate set pilots. Irrespective of what event triggered this message, the message will contain all Active and Candidate Set Pilots. In addition to these pilots, a "Keep" bit for each pilot is also sent, which is the Mobile stations method of informing the Network which Pilots it wants to keep or add to the Active set and which pilots it wants to drop from the Active Set. Neighbor Set or Remaining set pilots, whose Strengths actually trigger the Pilot Strength Measurement Message will first be put into the Candidate set before the Message is generated and sent to the Network.

The basic algorithm for selecting the active supplemental channel set is to limit the supplemental channels to those sectors whose pilot signal is the strongest. For example, the active supplemental channel set is limited to the three strongest pilot signals in the described embodiment of the invention. Comparing this algorithm to the active fundamental channel set, up to six strongest pilots may be used to select the active set of fundamental channels.

Because the number of sectors in the supplemental channel active set can be significantly lower than the number of sectors in the fundamental channel active set, several different methodologies may be employed for selecting the strongest two or three pilot channels for the active supplemental channel set. For example, a base station controller may ask a mobile station to transmit a periodic pilot strength measurement message (PPSMM) to enable the cellular network to determine which sectors should be included as the supplemental channel active set for the mobile station. For example, it has been suggested that the periodic PSMMs be transmitted every second or once every two seconds so that the strongest two or three sectors may be frequently determined. This approach should be reasonably effective at insuring that the strongest sectors are being used for transmitting supplemental channel data to the mobile station. One problem with this scheme is that it increases reverse link load and requires processing at the BTS and the BSC. Thus, the amount of resource consumed to implement this scheme is less than optimum. In other words, a scheme that requires less processing by the BTS and BSC would be preferred.

Accordingly, a method of the present invention includes using a combination of reverse link signal strength to noise information (Eb/No) in addition to using periodic PSMM to determine which supplemental channels should be part of the active supplemental channel set in one described embodiment of the present invention. Eb/No is, more specifically, a measured energy per bit over spectral noise density.

Figure 6:
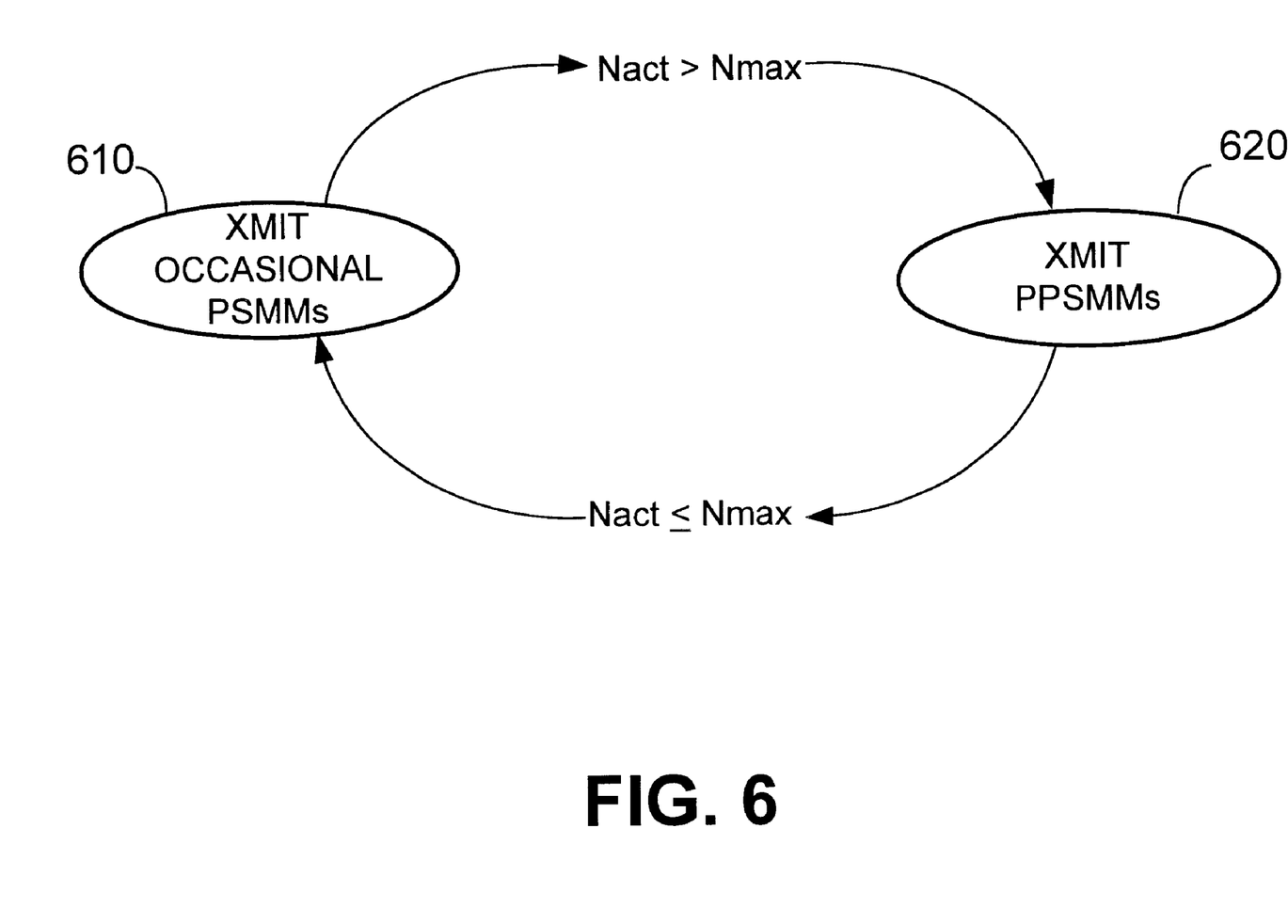
FIG. 6 is a state machine illustrating distributed logic for the transmission of pilot strength measurement messages that are to be transmitted by a mobile station.

FIG. 6 is a state machine illustrating distributed logic for the transmission of pilot strength measurement messages that are to be transmitted by a mobile station. As discussed before, a mobile station generates a pilot strength measurement message under a plurality of conditions including the detection of a new and strong pilot signal or the determination that a pilot signal associated with a forward traffic channel has dropped below a specified threshold.

According to one embodiment of the present invention, however, the base station controller will request that the mobile transmits periodic pilot strength measurement messages under specified conditions. More specifically, the system contemplates two modes of operation. The occasional pilot strength measurement messages are transmitted in an ordinary manner in a first mode of operation as illustrated at state 610. Whenever the active number of sectors carrying a fundamental channel exceeds the maximum number of active sectors that can be used to carry a supplemental channel, however, the system transitions into a mode of transmitting periodic pilot strength measurement message as reflected by state 620.

In the described embodiment of the invention, when the system is in a state 620, the mobile station will generate a periodic pilot strength measurement message once every two seconds in one embodiment of the invention. It is understood, of course, that the period may be varied. For example, in one embodiment, the periodic pilot strength measurement messages are transmitted once every three seconds and in another embodiment, once every second.

The mobile station remains in a periodic pilot strength measurement message state 620 as long as the number of sectors in the fundamental channel active set exceeds the maximum number of sectors in the supplemental channel active set. If the size of the fundamental channel active set drops to equal the maximum size of the supplemental channel active set, then the system transitions back to state 610 wherein pilot strength measurement messages are only transmitted occasionally according to ordinary operating guidelines described above.

In the described embodiment of the invention, the base station controller generates a signal to the mobile station to cause it to transition into the periodic pilot strength measurement message transmission state 620. Once the mobile station receives the command to transition into state 620, it remains in that state until such time that the base station controller generates a signal commanding it to transition to state 610 wherein pilot strength measurement messages are only transmitted occasionally according to specified conditions.

Figure 7:
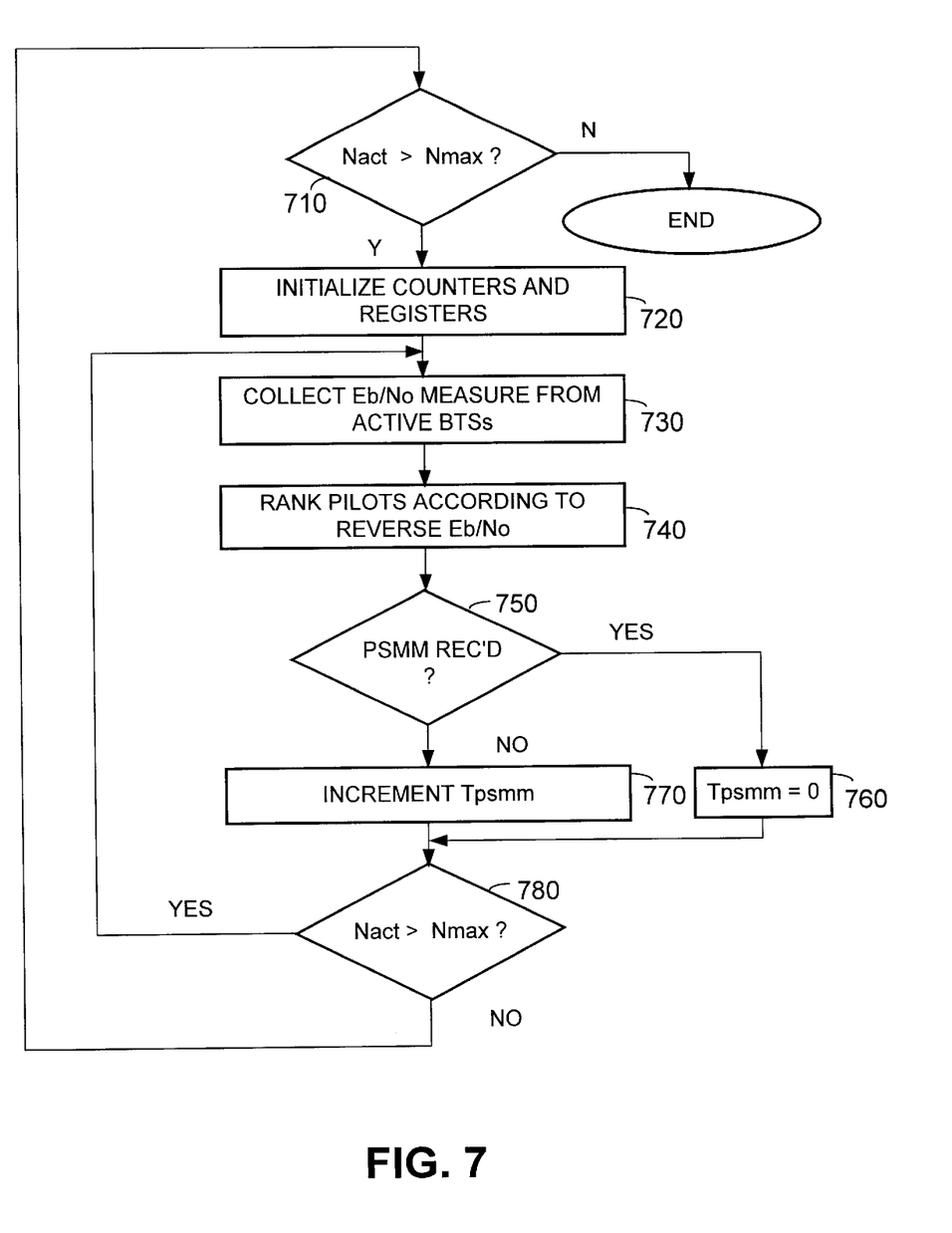
FIG. 7 is a flow chart illustrating a method within a base station controller for ranking pilots according to reverse link Eb/No according to one embodiment of the present invention.

FIG. 7 is a flow chart illustrating a method within a base station controller for ranking pilots according to reverse link Eb/No according to one embodiment of the present invention. FIG. 6 had illustrated the various states of operation according to the number of sectors in the fundamental channel active set in a relation to the number of sectors in the supplemental channel active set. As has been stated already, the number of sectors in the supplemental channel active set is typically limited in the described embodiment of the invention to two or three because of the back haul resources that are consumed in transmitting large amounts of data through a plurality of active sectors from various base station transceiver systems. Thus, whenever the number of sectors in the fundamental channel active set exceeded the number of active supplemental channel sectors, the system transitions into state 620 in which periodic pilot strength measurement messages are generated to insure that the active set of supplemental channels is likely the strongest set of communications links.

FIG. 7, therefore, illustrates a method within a base station controller that occurs while the system is in state 620 of FIG. 6. More specifically, the system continuously monitors to determine whether the number of active fundamental channel sectors is greater or less than or equal to the maximum number of active supplemental channel sectors (step 710).

It should be understood that the method of FIG. 7 illustrates a method that is continuously (periodically) performed in a processor while monitoring system conditions. Thus, if the number of active fundamental channel sectors is not greater than the maximum number of active supplemental channel sectors, the method is terminated until its next execution. Such condition would exist as long as the system is operating within state 610 of FIG. 6. Whenever the system transitions into state 620, however, the first execution of the method in FIG. 7 would lead to a result of yes at step 710, which causes the remainder of the method to be executed.

More specifically, the next step includes initializing counters and registers as is common whenever a routine is first executed (step 720). Thereafter, the reverse link Eb/No measurements that are determined by the active base station transceiver systems are collected and transmitted to the base station controller. The base station controller, therefore, collects the reverse link Eb/No measurements (step 730) and ranks pilot signals according to the measured reverse link Eb/No (step 740). After a list of pilots is ranked in step 740, the base station controller determines whether a pilot strength measurement message has been received (step 750). If a pilot strength measurement message has been received, then a counter is set equal to zero (step 760). If the pilot strength measurement message has not been received then the counter of step 760 is incremented (step 770).

Because the method of FIG. 7 is processed repetitively on a periodic basis, the counter incremented or set to zero in steps 770 or 760, respectively serves to represent a period of time since the last pilot strength measurement message was received. The reason for this is that the method of FIG. 7 is repeated on a frequent and relatively constant frequency. Thus the counter represents an approximate value of time that as elapsed.

In alternate embodiments of the present invention, rather than incrementing the counter, a base station controller merely evaluates the actual amount of time that has elapsed since the last pilot strength measurement message has been received. The amount of time or counter value will be used in other methods described herein.

Either after step 770 or 760, the base station controller evaluates whether the number of active fundamental channel sectors is greater than the maximum number of active supplemental channel sectors (step 780). If the answer is yes, then the system loops back to step 730 on the next iteration or execution of the method herein. If the number of active fundamental channel sectors is no longer greater than the maximum number of active supplemental channel sectors, then the method includes proceeding to step 710 upon the next execution of the method. One reason that the method of FIG. 7 is performed is to continuously maintain a list of pilots to determine the strongest communication channels for the supplemental channel active set in the event that a supplemental channel burst request is received.

Figure 8:
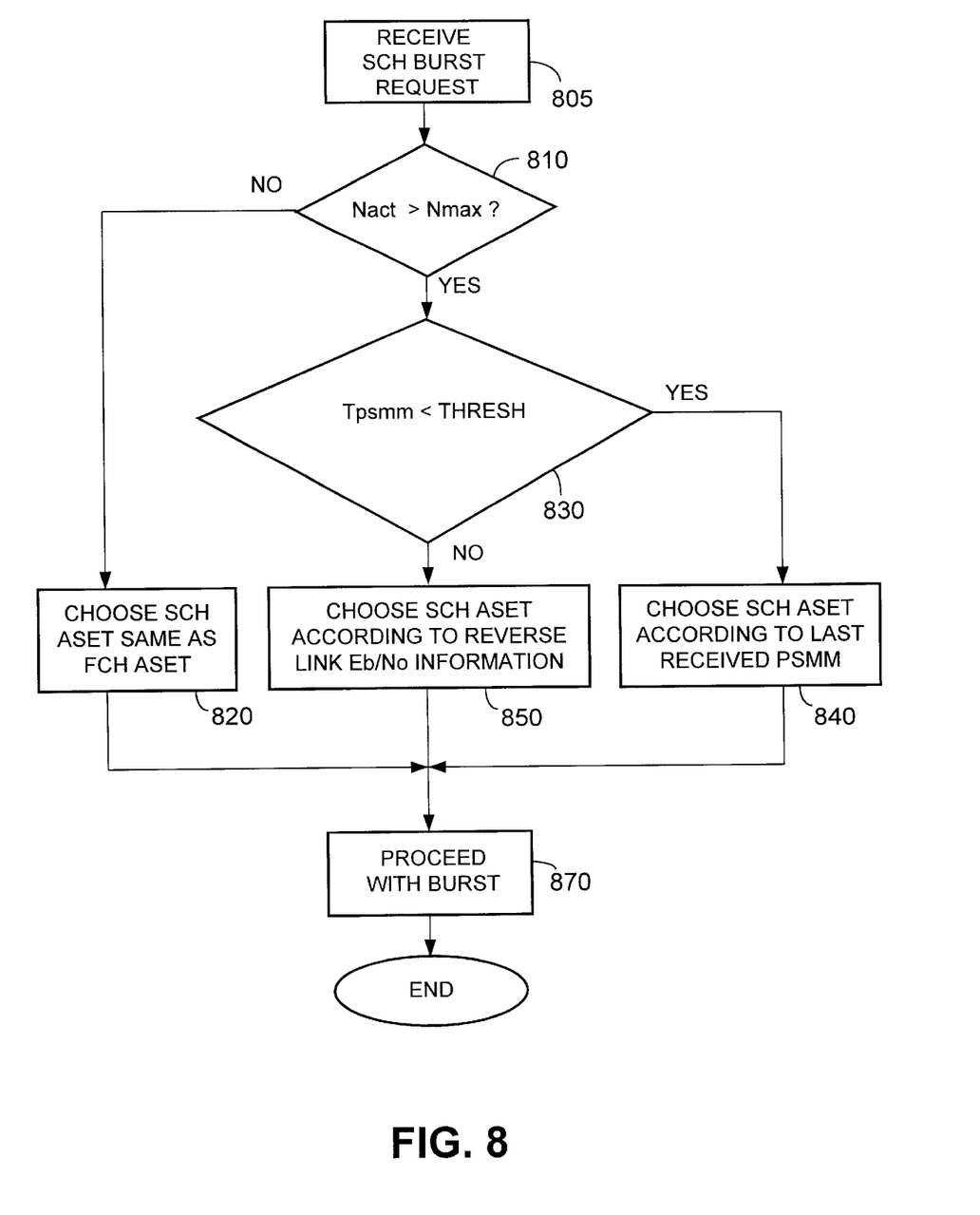
FIG. 8 is a flow chart illustrating a method performed by a base station controller whenever a supplemental channel burst request is received according to one embodiment of the present invention.

FIG. 8 is a flow chart illustrating a method performed by a base station controller whenever a supplemental channel burst request is received according to one embodiment of the present invention. Whenever a supplemental channel burst request is received (step 805), the system initially evaluates whether the number of active fundamental channel sectors is greater than the maximum number of sectors in the supplemental channel active set (step 810).

If the number of active fundamental channel sectors is not greater than the maximum number of active supplemental channel sectors, then the active set of the supplemental channel is selected to equal the active set of the fundamental channel (step 820). If, however, the active number of fundamental channel sectors is greater than the maximum number of active supplemental channel sectors, then the system evaluates whether the counter of steps 760 and 770 of FIG. 7 is below a defined threshold value (step 830). If the counter is below the specified threshold, then the supplemental active set of sectors is chosen according to the last received pilot strength measurement message that was generated by the mobile station (step 840). This is true regardless of whether the pilot strength measurement message was generated by the mobile according to the detection of a defined event as described herein or whether it was generated as a periodic pilot strength measurement message.

If the counter of steps 760 or 770 is not below the specified threshold, then the supplemental active set of sectors is chosen according to the reverse link Eb/No information (step 850). More specifically, the active set of supplemental channel sectors is chosen according to the pilots that were ranked according to reverse link Eb/No in step 740 of FIG. 7. As indicated in the discussion of FIG. 7, the method of 830 includes evaluating a counter value. However, if elapsed time is used as a measurement parameter instead of a counter value then step 830 involves evaluating whether the elapsed time is below a defined threshold. After each of the steps 820, 840, or 850 herein FIG. 8, the next step of the method includes proceeding with the supplemental channel burst step 870. The method of FIG. 8 is then repeated the next time that a supplemental channel burst request is received in step 805.

Figure 9:
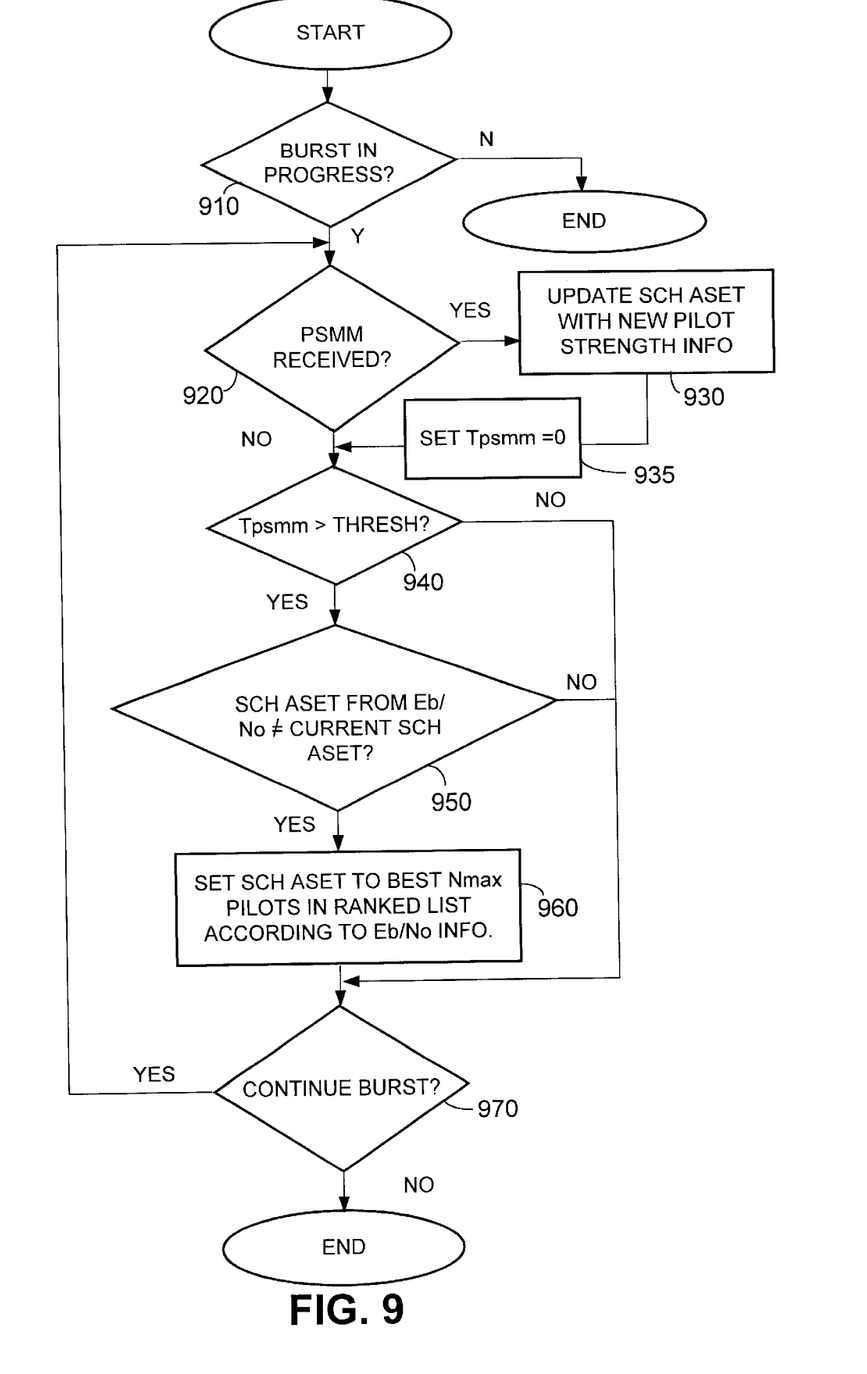
FIG. 9 is a flow chart illustrating a method within a base station controller for selecting the active set of supplemental channels during a burst according to one embodiment of the present invention.

FIG. 9 is a flow chart illustrating a method within a base station controller for selecting the active set of supplemental channel sectors during a burst according to one embodiment of the present invention. Referring now to FIG. 9, the method includes determining, in a base station controller whether a burst is in progress (step 910). As before, the method herein is one that is continuously or periodically performed. If a burst is not in progress, the method of FIG. 9 is terminated. If a burst is in progress, however, then the method includes determining whether a pilot strength measurement message has been received (step 920). If a pilot strength measurement message has been received, then the active set of supplemental channel sectors is updated with new pilot strength information received within the pilot strength measurement message (step 930). After the supplemental channel active set is updated in 930, the timer Tpsmm is reset to zero (step 935). If a pilot strength measurement message has not been received, however, then the method includes determining whether the counter of set 750 or 760 of FIG. 7 has exceeded a specified threshold (step 940). As before, this threshold could also be evaluated against a lapsed time. If the threshold has been exceeded, the system determines whether the active set of supplemental channel sectors from the reverse link Eb/No information is not equal to the current set of supplemental channels (step 950). If they are not equal, then the active set of supplemental channel sectors is selected to the pilots that were ranked according to the reverse link Eb/No information (step 960). If the answer was no then the determination made in step 940 and 950 or if the answers were yes to both of those and step 960 was performed, then the method includes determining whether the burst is continuing (step 970). If the burst is continuing, then step 920 is repeated. If the burst is not being continued, then the method is terminated until the next iteration or execution of the method shown in FIG. 9.

Figure 10:
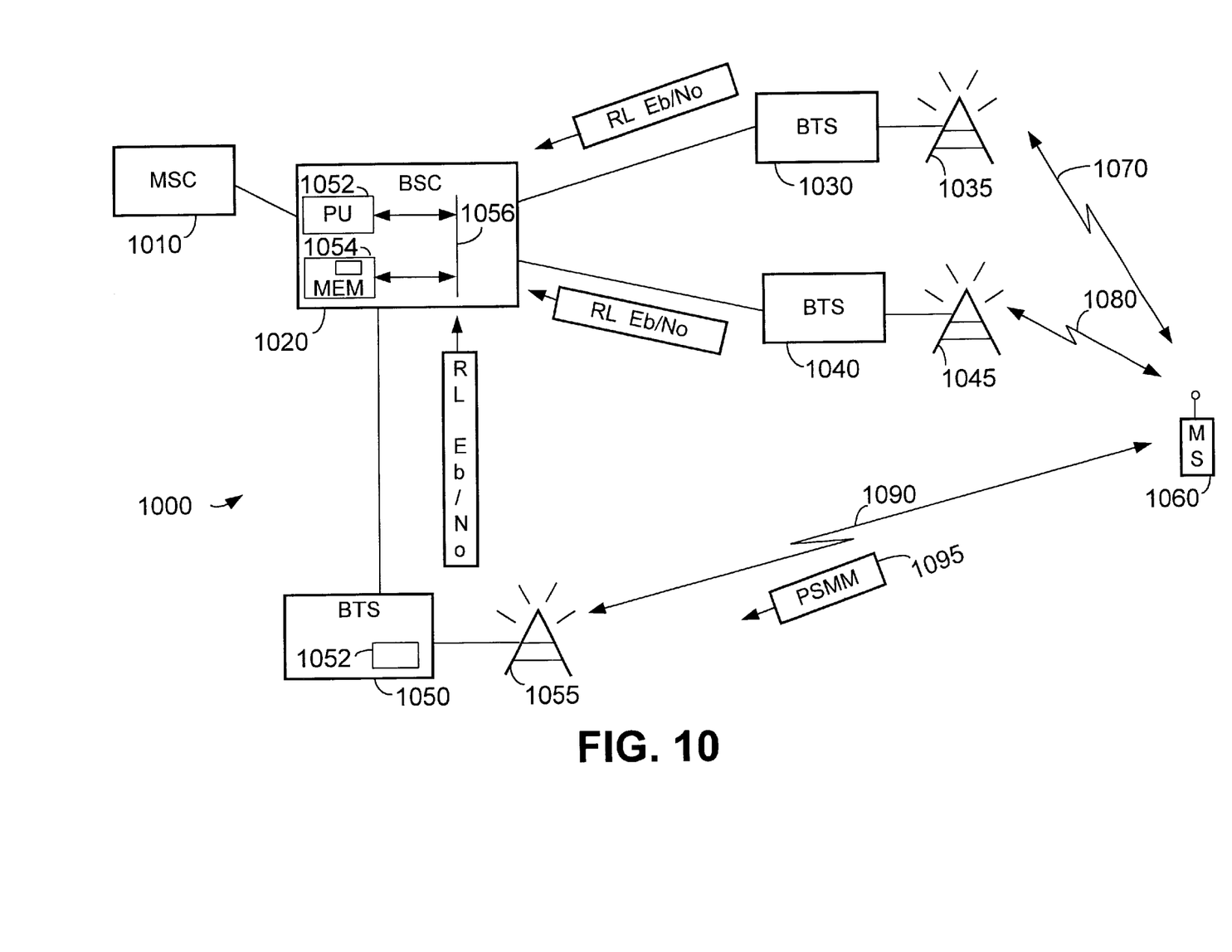
FIG. 10 is a functional block diagram of a communication network according to an embodiment of the present invention.

FIG. 10 is a functional block diagram of a communication network according to an embodiment of the present invention. Referring now to FIG. 10, a network shown generally at 1000 includes a mobile switching center 1010 that is coupled to communicate with a base station controller 1020 which in turn is coupled to communicate with a plurality of base station transceiver systems 1030, 1040, and 1050. Each of the base station transceiver systems is coupled to a plurality of antennas 1035, 1045, and 1055, respectively. Each of the base station transceiver systems 1030, 1040, and 1050 communicate with mobile stations, by way of example, mobile station 1060 through the antennas 1035, 1045, and 1055, respectively.

More specifically, each of the base station transceiver systems 1030, 1040, and 1050 creates a wireless communication link 1070, 1080, and 1090 respectively with mobile station 1060.

Each base station controller includes a processing unit 1052 and a memory 1054. Memory 1054 includes computer instructions that define the operational logic of the base station controller. Processing unit 1052 receives the computer instructions stored in memory 1054 by way of an internal bus 1056. Thus, processing unit 1052 receives the computer instructions over bus 1056 and executes them to perform the method and processes of the present invention.

While the described embodiment includes a processing unit that executes the computer instructions stored within memory 1054, an alternative design of the present invention includes the use of ASIC processors that are formed specifically to execute the defined logic. Accordingly, in the alternate embodiment of the invention, the ASIC processor itself will include circuit modules that perform the logic defined by the inventive processes herein. It is understood, therefore, that in the discussion herein relating to processing unit and memory, execution of the inventive methods may alternately be performed by a module. Similarly, in the discussion relating to a module that executes the specified logic may also be alternately implemented in the scheme including processing units, memory, and internal buses.

Each of the base transceiver sets, by way of example, base station transceiver system 1050, includes a module that determines the reverse link Eb/No for the communication signals transmitted by mobile station 1060 to antenna 1055. Thus, BTS 1050 determines the reverse link Eb/No and transmits the same to base station controller 1020. As described herein, base station transceiver system 1050 may implement the module 1052 either in hardware, or in software stored as computer instructions within an internal memory that is executed by an internal processor.

In operation, the mobile station 1060 transmits the pilot strength measurement message 1095 over communication link 1090 to antenna 1055 which then conducts the same to BTS 1050. BTS 1050 then transmits the pilot strength measurement message to BSC 1020. Additionally, module 1052 of BTS 1050 calculates the reverse link Eb/No and transmits the same in a message 1054 to BSC 1020.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. For example, the circuitry described herein may be formed of electrical or optical components or a combination thereof. Additionally, the logic of the above described invention may be formed in hardware or defined by computer instructions stored in memory and executed by a processor. As may be seen, the described embodiments may be modified in many different ways without departing from the scope or teachings of the invention.

What is claimed is:

1. A base station controller, comprising:

circuitry to prompt the base station controller to transmit a signal to a mobile station to cause the mobile station to transmit pilot strength measurement messages only when defined conditions are detected;

circuitry to prompt the base station controller to transmit a signal to the mobile station to cause it to generate pilot strength measurement messages on a periodic basis; and wherein the base station controller transmits a signal to the mobile station to prompt it to transmit periodic pilot strength measurement messages whenever an active number of fundamental channels is greater than a maximum number of active supplemental channel sectors.

2. A base station controller, comprising:

circuitry to prompt the base station controller to transmit a signal to a mobile station to cause the mobile station to transmit pilot strength measurement messages only when defined conditions are detected;

circuitry to prompt the base station controller to transmit a signal to the mobile station to cause it to generate pilot strength measurement messages on a periodic basis; and wherein the base station controller transmits a signal to the mobile station to cause it to transmit pilot strength measurement messages only upon detecting conditions whenever the active number of fundamental channel sectors is equal to or less than the maximum number of active supplemental channel sectors.

3. A method for selecting an active set of supplemental channel sectors in a code division multiple access system, comprising:

determining an approximate amount of time since a pilot strength measurement message was received from a mobile station;

determining a signal strength over noise value;

selecting an active set of supplemental channel sectors based upon one of the determined signal strength over noise value or the list of strongest pilots as indicated from the pilot strength measurement message; and wherein the set of active supplemental channel sectors is determined by evaluating the signal strength over noise value whenever a specified amount of time has elapsed since the last pilot strength measurement message was received.

4. The method of claim 3 wherein the set of active supplemental channel sectors is determined by evaluating the pilot signal strength whenever the amount of time that has elapsed since the last pilot strength measurement message was received is below a specified amount of time.

5. The method of claim 3 wherein the step of selecting includes evaluating a threshold value of time that is approximately equal to two seconds.

6. The method of claim 3 wherein the approximate amount of time is determined by evaluating the actual amount of time that has elapsed.

7. The method of claim 3 wherein the approximate amount of time is determined by evaluating a counter value that is incremented each time the determination is made since the last pilot signal strength measurement message was received.

8. Circuitry for selecting a set of active supplemental channel sectors, comprising:

a memory for storing computer instructions;

a bus coupled to the memory;

a processor coupled to the bus to receive and execute computer instructions stored within the memory;

wherein the computer instructions define logic to prompt the processor to select the active set of supplemental channel sectors according the approximate amount of time that has elapsed since a last pilot signal strength measurement message was received from a mobile station;

wherein the logic of the computer instructions utilizes a counter that is incremented each time the processor determines the active set of supplemental channel sectors;

wherein the counter is reset each time a pilot signal strength measurement message is received; and wherein the counter value represents an approximate amount of time since the last pilot signal strength measurement message was received.

9. The circuitry of claim 8 wherein the approximate amount of time is determined by evaluating the amount of time that has elapsed.

10. The circuitry of claim 8 wherein the approximate amount of time is defined as a threshold value and is equal to two seconds.

11. The circuitry of claim 8 wherein the active supplemental set of channel sectors is determined at a time when a supplemental channel is needed to carry data.

12. A wireless communications transceiver, comprising:

circuitry to transmit a signal to the mobile station to prompt it to generate pilot strength measurement messages on a periodic basis; and circuitry to transmit a signal to a mobile station to prompt the mobile station to transmit pilot strength measurement messages whenever an active number of fundamental channels is greater than a maximum number of active supplemental channel sectors.

13. A wireless communications transceiver, comprising:

circuitry to transmit a signal to the mobile station to prompt it to generate pilot strength measurement messages on a periodic basis; and circuitry to transmit a signal to a mobile station to prompt the mobile station to transmit pilot strength measurement messages whenever the active number of fundamental channel sectors is equal to or less than the maximum number of active supplemental channel sectors.

* * * * *